United States Patent
Yang (10) Patent No.: US 9,995,315 B2
(45) Date of Patent: Jun. 12, 2018

(54) CEILING FAN MOTOR HOUSING AND COVER SIDE FIXING STRUCTURE

(71) Applicant: Champ-ray Industrial Co., LTD, Taichung (TW)

(72) Inventor: Wei-Cheng Yang, Taichung (TW)

(73) Assignee: CHAMP-RAY INDUSTRIAL CO., LTD, Taichung (TW)

( * ) Notice: Subject to any disclaimer, the term of this patent is extended or adjusted under 35 U.S.C. 154(b) by 245 days.

(21) Appl. No.: 14/996,022

(22) Filed: Jan. 14, 2016

(65) Prior Publication Data

US 2017/0175774 A1 Jun. 22, 2017

(30) Foreign Application Priority Data

Dec. 21, 2015 (TW) .............................. 104142958 A (51) Int. Cl.
| | |
|---|---|
| *H02K 5/04* | (2006.01) |
| *F04D 29/64* | (2006.01) |
| *F04D 25/08* | (2006.01) |
| *H02K 5/20* | (2006.01) |
| *F04D 25/06* | (2006.01) |
| *H02K 1/27* | (2006.01) |
| *H02K 7/14* | (2006.01) |

(52) U.S. Cl.
CPC ....... *F04D 29/646* (2013.01); *F04D 25/0606* (2013.01); *F04D 25/088* (2013.01); *H02K 1/2786* (2013.01); *H02K 5/20* (2013.01); *H02K 7/14* (2013.01)

(58) Field of Classification Search
CPC .. F04D 29/646; F04D 25/0606; F04D 25/088; H02K 5/165; H02K 5/1677; H02K 5/1737; H02K 5/20; H02K 5/04; H02K 1/2786; H02K 1/187; H02K 7/14
USPC ........................................ 310/58, 59, 91, 406
See application file for complete search history.

(56) References Cited

U.S. PATENT DOCUMENTS

| | | | | |
|---|---|---|---|---|
| 3,175,755 | A | * 3/1965 | Rockafield | .............. F04D 17/16 310/67 R |
| 6,438,322 | B1 | * 8/2002 | Reiker | .................. F04D 25/088 392/364 |
| 2008/0284423 | A1 | * 11/2008 | Yu | ......................... H02K 11/215 310/68 R |
| 2010/0109465 | A1 | * 5/2010 | Yang | ...................... F04D 25/088 310/156.12 |
| 2015/0369252 | A1 | * 12/2015 | Janecek | ................ F04D 25/088 417/420 |

* cited by examiner

*Primary Examiner* — Michael Andrews
(74) *Attorney, Agent, or Firm* — Ming Chow; Sinorica, LLC (57) ABSTRACT

A ceiling fan motor housing and cover side fixing structure includes a motor housing, a cover and a stator. The motor housing includes a rotor and plural side guide holes formed on a sidewall. The cover includes plural fixing holes formed at an edge of a top circular flange, and the side guide holes opposite to the fixing holes are fixed by plural passing-through fixing members, so that the motor housing and the cover are combined for accommodating the stator to simplify the overall assembly of the ceiling fan motor effectively, and provide a convenient way of combining the motor housing and the cover without increasing the width. Further, the wire winding space of the stator in the motor housing and the cover of the ceiling fan motor is increased for convenient assembling.

3 Claims, 7 Drawing Sheets

CEILING FAN MOTOR HOUSING AND COVER SIDE FIXING STRUCTURE

The current application claims a foreign priority to application Ser. No. 104142958 filed on Dec. 21, 2015 in Taiwan.

FIELD OF THE INVENTION

The present invention relates to a ceiling fan motor housing and cover side fixing structure, and more particularly to a fixing of laterally fixing a motor housing and a cover to increase the wire winding space of a rotor.

BACKGROUND OF THE INVENTION

Figure 6:
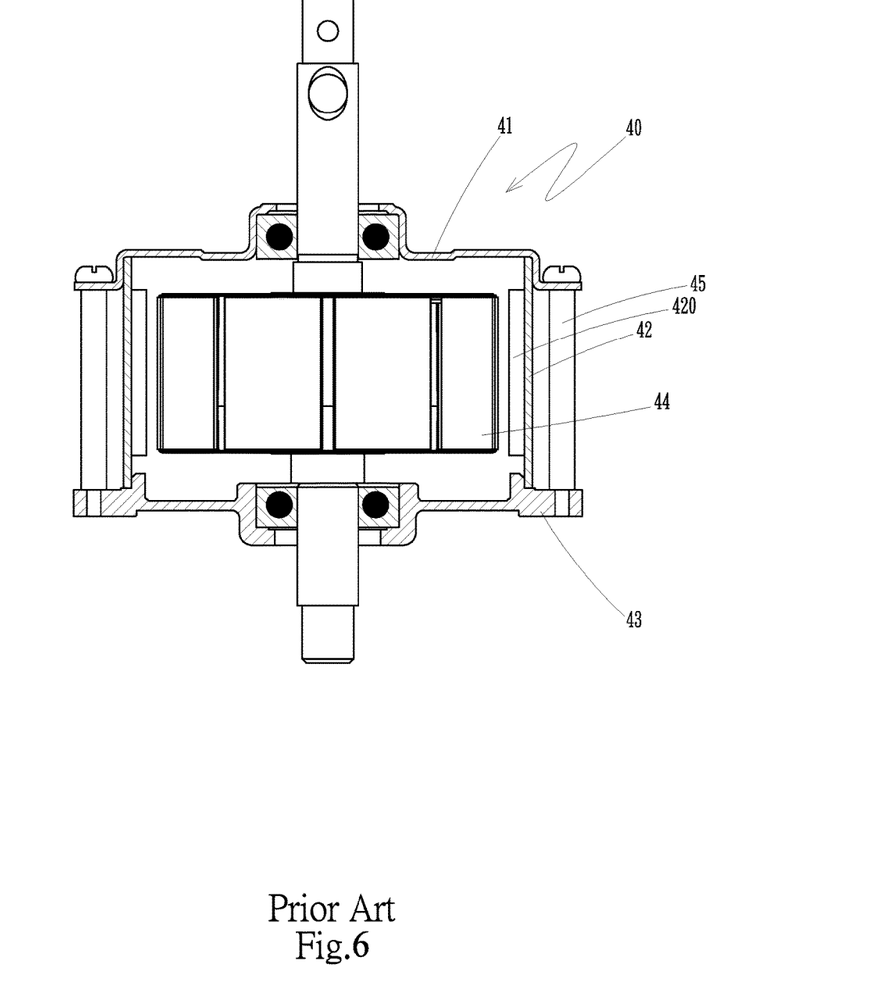
FIG. 6 is a side cross-sectional view of a conventional ceiling fan motor comprising an upper casing, a middle ring, a lower casing and a stator.
Figure 7:
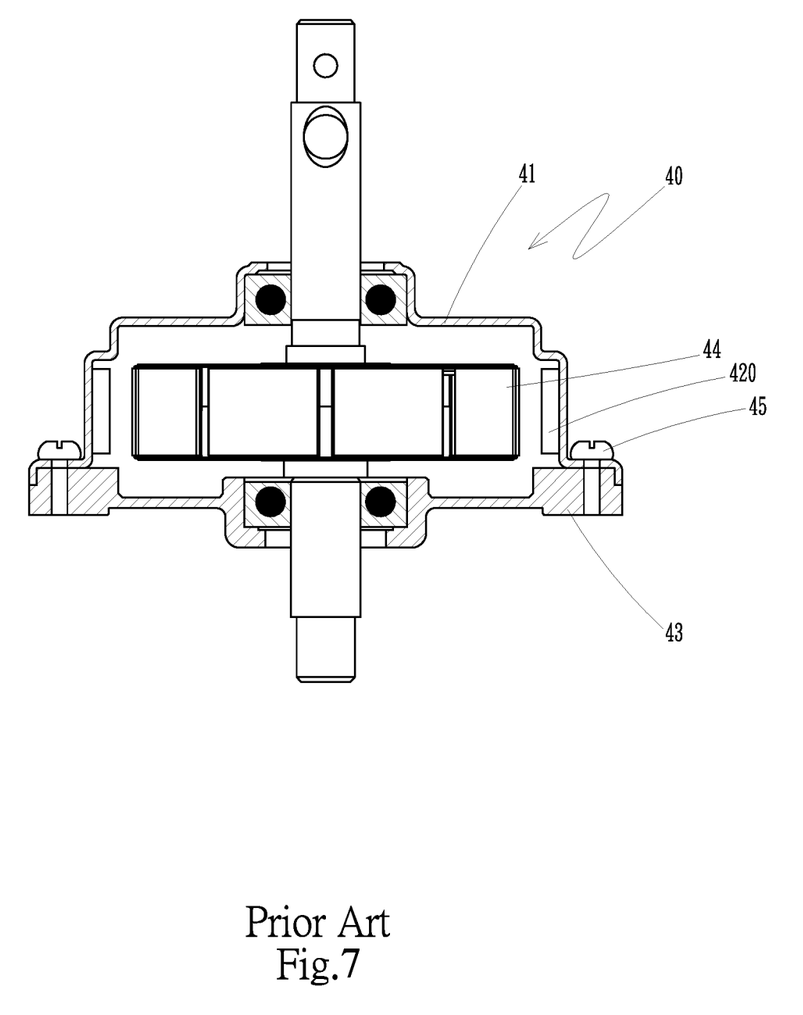
FIG. 7 is a side cross-sectional view of a conventional ceiling fan motor comprising an upper casing, a lower casing, and a stator.

With reference to FIG. 6 for a conventional ceiling fan motor, the conventional ceiling fan motor 40 comprises an upper casing 41, a middle ring 42, a lower casing 43 and a stator 44, and the upper casing 41 and the lower casing 43 are engaged with upper and lower sides of the middle ring 42 respectively, and a plurality of screws 45 are passed and combined between the upper casing 41 and the lower casing 43, and after the upper casing 41, the middle ring 42 and the lower casing 43 are combined, an accommodating space is formed for accommodating a stator 44, and a rotor 420 is installed around an inner sidewall of the middle ring 42. The aforementioned structure constitutes a ceiling fan motor 40. Another conventional ceiling fan motor may comprise the upper casing 41, the lower casing 43 and the stator 44 only. However, the overall structure includes many components and thus causes an inconvenient assembling process, and a flange is extended outwardly from edges of the upper and lower casings 41, 43 for passing and combining the screws 45, so that it is necessary to increase the width of the ceiling fan motor 40. In addition, there is a wire winding space difference of the stator 44 inside the ceiling fan motor 40.

SUMMARY OF THE INVENTION

In view of the aforementioned problems of the conventional ceiling fan motor, it is a primary objective of the present invention to overcome the aforementioned problems such as increasing the width of the ceiling fan motor and improving the wire winding space difference of the rotor by providing a ceiling fan motor housing and cover side fixing structure in accordance with the present invention.

To achieve the aforementioned objective, the present invention provides a ceiling fan motor housing and cover side fixing structure comprising a motor housing, a cover and a stator, and the motor housing has a top side, a sidewall, an upper through hole formed at the center of the top side, an upper accommodating groove formed at a position opposite to the upper through hole, a bearing installed in the upper accommodating groove, a plurality of side guide holes disposed opposite to the sidewall and each having a countersunk groove and a passing-through fixing member passing through the countersunk groove, wherein the passing-through fixing member is a bolt or a countersunk bolt, and a rotor is installed around an inner side of the sidewall, and the cover has a cover body and a top circular flange, and a lower through hole is formed at the center of the cover body, and a lower accommodating groove is formed opposite to the lower through hole, and the lower accommodating groove includes a bearing accommodated and installed therein, and a plurality of fixing holes are formed opposite to an edge of the top circular flange, and the fixing hole has a locking thread formed therein, and a plurality of vane fixing holes is formed on the top of the top circular flange and penetrated through the cover, and an axle is passed and installed at the center of the stator, and the top side of the axle of the stator is passed and installed to the bearing at the upper accommodating groove of the top side of the motor housing and the upper through hole, and the lower side of the axle of the stator is passed and installed to the bearing at the lower accommodating groove of the cover body of the cover and the lower through hole, and the plurality of side guide holes formed on the sidewall of the motor housing are configured to be opposite to the plurality of fixing holes formed at the edge of the top circular flange of the cover, and a plurality of bolts or countersunk bolts of the plurality of passing-through fixing members passing through the side guide holes are passed, locked, and fixed to the locking thread of the fixing hole, and an end of the countersunk bolt is concealed into the countersunk groove of the side guide hole. Therefore, the motor housing and the cover can be passed and fixed laterally to simplify the overall assembly of the ceiling fan motor effectively, and the ceiling fan motor does not need to increase its width in order to combine the motor housing and the cover, and the wire winding space of the stator installed in the motor housing and the cover of the ceiling fan motor can be increased, and after the motor housing and the cover are combined, the ceiling fan and its housing can be used directly, so as to provide a convenient assembling process and an excellent wire winding space of the stator.

The technical characteristics, contents, advantages and effects of the present invention will be apparent with the detailed description of a preferred embodiment accompanied with the illustration of related drawings as follows.

DESCRIPTION OF THE PREFERRED EMBODIMENTS

Figure 1:
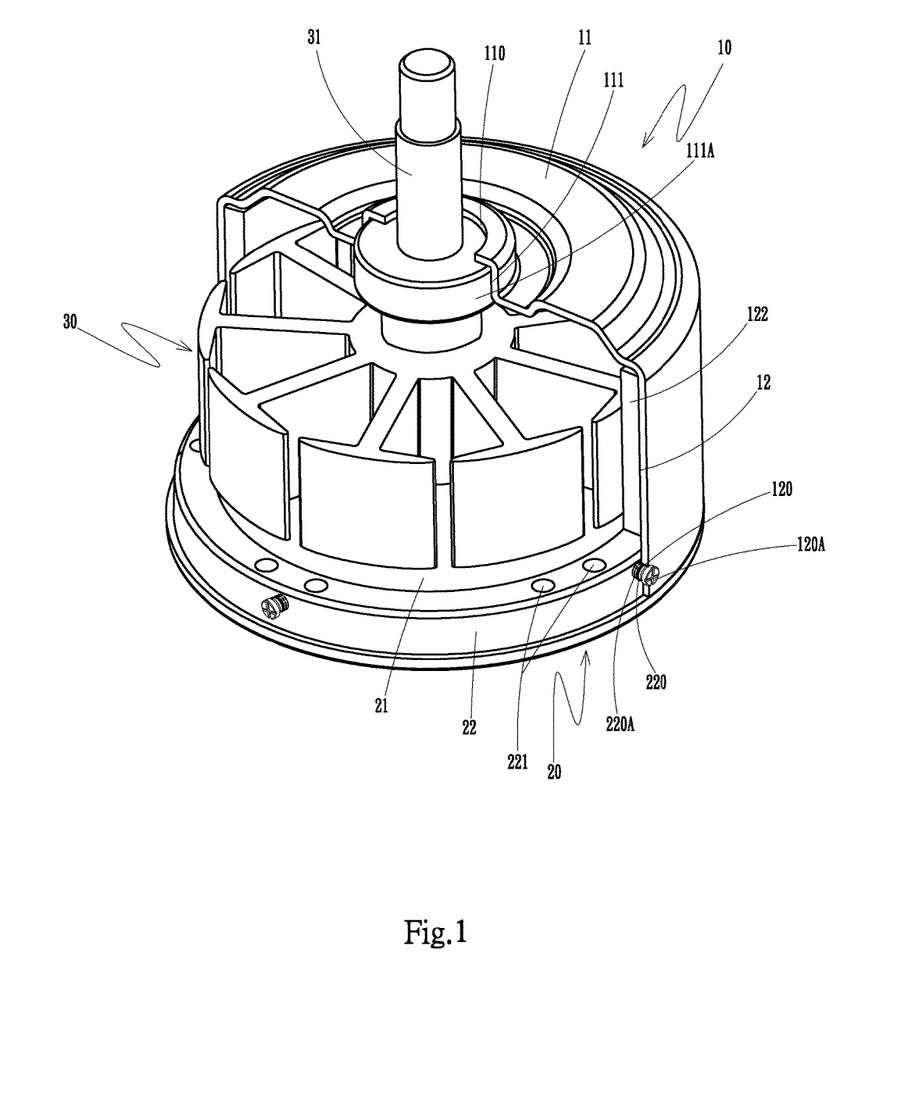
FIG. 1 is a partial cross-sectional perspective view of the present invention.
Figure 2:
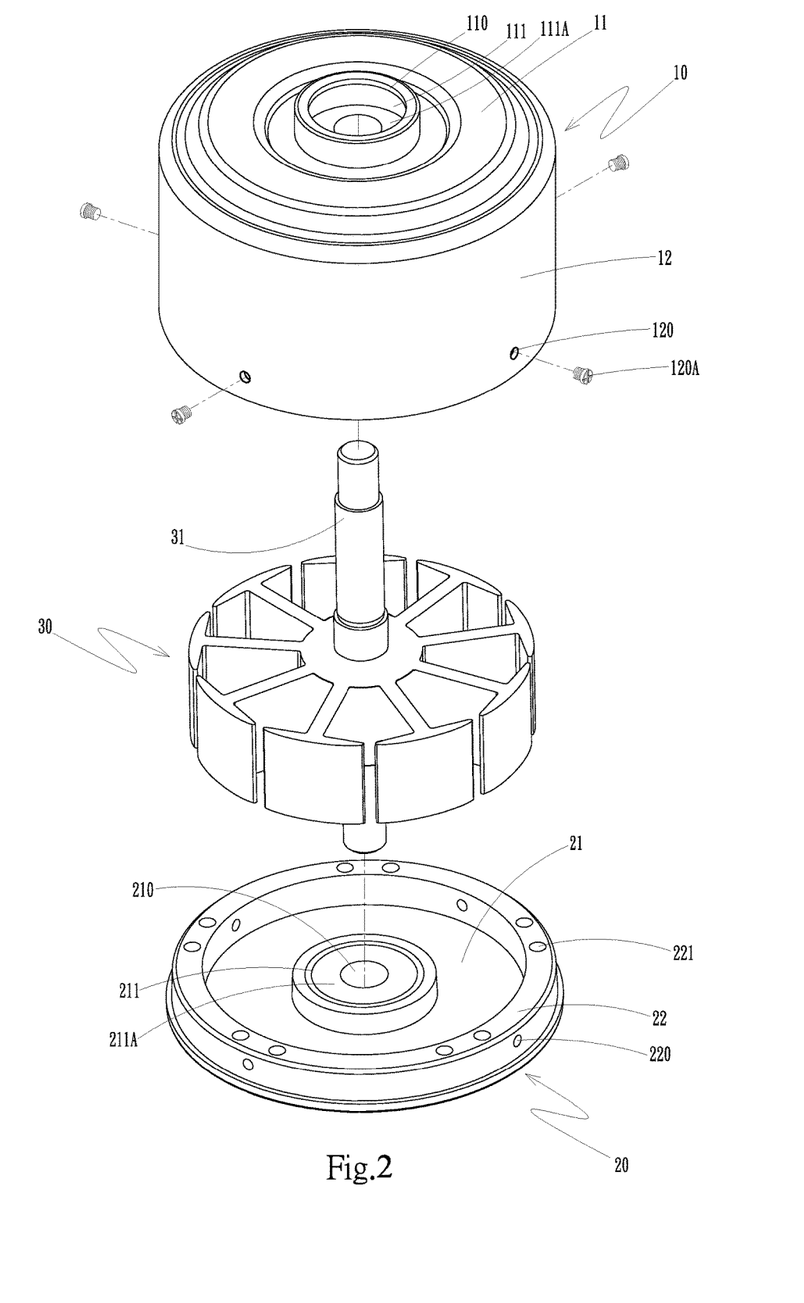
FIG. 2 is an exploded view of the present invention.
Figure 3:
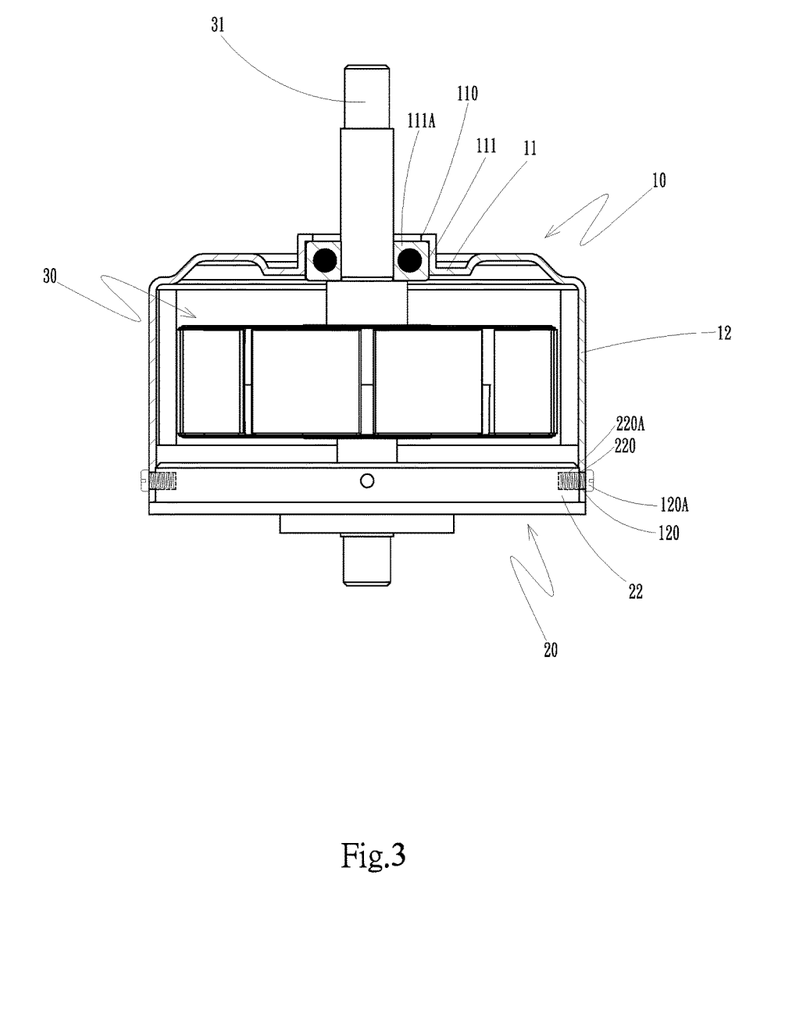
FIG. 3 is a side exploded view of the present invention.

With reference to FIGS. 1 to 3 for a partial cross-sectional view, an exploded view and a side cross-sectional view of a ceiling fan motor housing and cover side fixing structure in accordance with the present invention respectively, the structure comprises the following components.

A motor housing 10 has a top side 11 and a sidewall 12, and an upper through hole 110 is formed at the center of the top side 11, and an upper accommodating groove 111 is formed and configured to be opposite to the upper through hole 110, and the upper accommodating groove 111 includes a bearing 111A accommodated and installed therein, and a plurality of side guide holes 120 are formed and configured to be opposite to the sidewall 12, and a passing-through fixing member 120A is passed and installed into each respective side guide hole 120, wherein the passing-through fixing member 120A is a bolt, and a rotor 122 is installed around an inner side of the sidewall 12.

A cover 20 has a cover body 21 and a top circular flange 22, and a lower through hole 210 is formed at the center of the cover body 21, and a lower accommodating groove 211 is formed and configured to be opposite to the lower through hole 210, and the lower accommodating groove 211 includes a bearing 211A accommodated and installed therein, and a plurality of fixing holes 220 are formed and configured to be opposite to the edge of the top circular flange 22, and the fixing hole 220 has a locking thread 220A formed therein, and a plurality of vane fixing holes 221 are formed at the top of the top circular flange 22 and penetrated through the cover 20, and the plurality of fixing holes 220 formed at the edge of the top circular flange 22 are configured to be opposite to the plurality of side guide holes 120 formed on the sidewall 12 of the motor housing 10, and passed by a plurality of passing-through fixing members 120A at the side guide holes 120 of the sidewall 12 and locked and fixed by the locking thread 220A of the fixing hole 220.

A stator 30 includes an axle 31 passed and installed at the center of the stator 30, and an upper side of the axle 31 is passed and installed to the bearing 111A at the upper accommodating groove 111 and the upper through hole 110 of the top side 11 of the motor housing 10, and a lower side of the axle 31 is passed and installed to the bearing 211A at the lower accommodating groove 211 and the lower through hole 210 of the cover body 21 of the cover 20.

By the aforementioned components, the ceiling fan motor housing and cover side fixing structure of the present invention is produced.

With reference to FIGS. 1 to 3 for a partial perspective cross-sectional view, an exploded view and a side cross-sectional view of a ceiling fan motor housing and cover side fixing structure in accordance with the present invention respectively, the upper and lower sides of the axle 31 of the stator 30 are passed and installed to the bearing 111A at the upper accommodating groove 111 of the top side 11 of the motor housing 10 and the bearing 211A at the lower accommodating groove 211 of the cover body 21 of the cover 20, and the plurality of side guide holes 120 formed on the sidewall 12 of the motor housing 10 are configured to be opposite to the plurality of fixing holes 220 formed at an edge of the top circular flange 22 of the cover 20, and a plurality of passing-through fixing members 120A of the side guide holes 120 are locked and fixed to the locking thread 220A of the fixing hole 220, and the motor housing 10 and the cover 20 can be passed and installed laterally to simplify the overall assembly of the ceiling fan motor effectively, and the ceiling fan motor does not need to increase its width in order to combine the motor housing 10 and the cover 20, and the wire winding space of the stator 30 installed in the motor housing 10 and the cover 20 of the ceiling fan motor can be increased, and after the motor housing 10 and the cover 20 are combined, the ceiling fan and its housing can be used directly, so as to provide a convenient assembling process and an excellent wire winding space of the stator.

Figure 4:
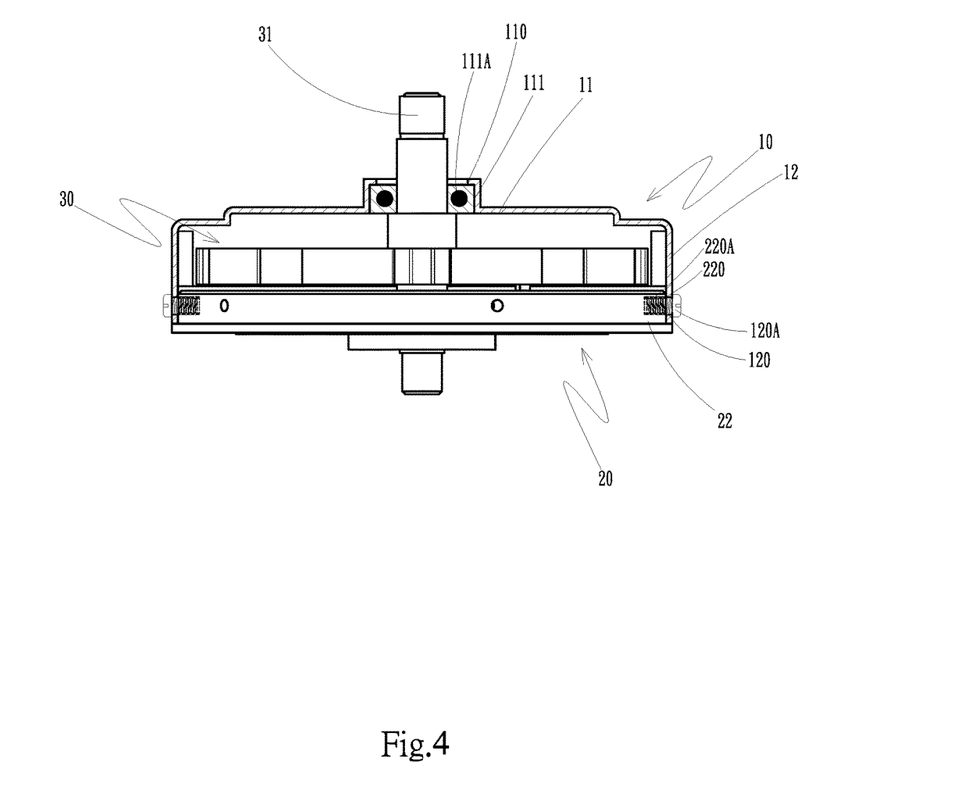
FIG. 4 is a side cross-sectional view of a thin ceiling fan motor in accordance with a first embodiment of the present invention.
Figure 5:
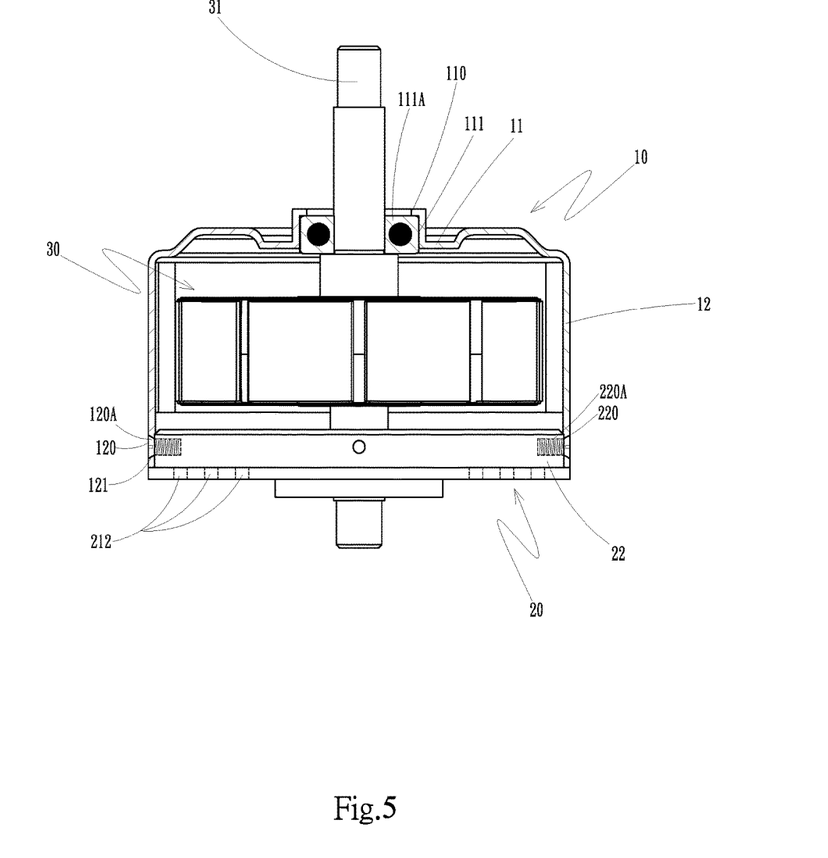
FIG. 5 is a side cross-sectional view of a countersunk bolt operated with a countersunk groove in accordance with a second embodiment of the present invention.

With reference to FIGS. 4 and 5 for a side cross-sectional view of a thin ceiling fan motor in accordance with the first embodiment of the present invention and a ceiling fan motor housing and cover side fixing structure with a bolt and a countersunk groove in accordance with the second embodiment of the present invention respectively, the overall structure is substantially the same as that illustrated in FIGS. 1 to 3 of the present invention, except that the height of the sidewall 12 of the motor housing 10 is decreased, and the thickness of the stator 30 is decreased without changing the width of the stator 30, so that a thin ceiling fan motor is formed. In addition, each of the side guide holes 120 formed on the sidewall 12 of the motor housing 10 has a countersunk groove 121, and the passing-through fixing member 120A passing through the side guide hole 120 is a countersunk bolt, and the countersunk bolts of the plurality of passing-through fixing members 120A passing through the side guide holes 120 are passed, locked and fixed to the locking thread 220A of the fixing hole 220, and an end of the countersunk bolt is concealed in the countersunk groove 121 of the side guide hole 120, and a plurality of heat dissipating holes 212 are formed around the edge of the lower accommodating groove 211 of the cover body 21 to extend the scope of applicability of the present invention.

What is claimed is:
1. A ceiling fan motor housing and cover side fixing structure comprising:
   a motor housing;
   the motor housing comprising a top side, a sidewall, an upper through hole, a plurality of side guide holes and an upper accommodating groove, the upper through hole being formed at a center of the top side, the upper through hole axially penetrating the top side, the plurality of side guide holes being formed and disposed opposite to the sidewall, the side guide hole laterally penetrating the sidewall, the upper accommodating groove being formed on the top side of the motor housing and opposite to the upper through hole;
   a rotor;
   the rotor being installed around an inner side of the sidewall;
   a cover;
   the cover comprising a cover body, a top circular flange, a lower through hole, a plurality of fixing holes and a lower accommodating groove, the lower through hole being formed at a center of the cover body, the lower through hole axially penetrating the cover body, the plurality of fixing holes being formed and disposed opposite to a side of the top circular flange, the fixing hole laterally penetrating the top circular flange, the plurality of fixing holes formed on the side of the top circular flange being configured to be opposite to the plurality of side guide holes formed on the sidewall of the motor housing, the lower accommodating groove being formed on the cover body and opposite to the lower through hole;
   a stator;
   the stator comprising an axle, the axle passing through and being installed at a center of the stator, the axle comprising an upper side and a lower side, the upper side of the axle passing through and being installed at the upper through hole formed at the top side of the motor housing, the lower side of the axle passing through and being installed at the lower through hole formed on the cover body of the cover;
   an upper bearing;
   the upper bearing being accommodated and installed in the upper accommodating groove;
   a lower bearing;
   the lower bearing being accommodated and installed in the lower accommodating groove;

the upper side of the axle of the stator passing through and being installed to the upper bearing at the upper accommodating groove and the upper through hole of the top side of the motor housing;

the lower side of the axle of the stator passing through and being installed to the lower bearing at the lower accommodating groove and the lower through hole of the cover body of the cover;

a plurality of passing-through fixing members;

a corresponding passing-through fixing member among the plurality of passing-through fixing members being configured to laterally pass through a corresponding side guide hole among the plurality of side guide holes and a corresponding fixing hole among the plurality of fixing holes so as to render the motor housing and the cover being laterally fixed with each other without axially fixing the motor housing with the cover;

the passing-through fixing member being a bolt;

a plurality of locking threads;

a corresponding locking thread among the plurality of locking threads being formed in a corresponding fixing hole among the plurality of fixing holes at an edge of the top circular flange of the cover; and the corresponding passing-through fixing member among the plurality of passing-through fixing members being configured to be fixed to the corresponding locking thread among the plurality of locking threads.

2. The ceiling fan motor housing and cover side fixing structure according to claim 1, further comprising a plurality of vane fixing holes, the plurality of vane fixing holes being formed at a top of the top circular flange of the cover and penetrating through the cover.

3. The ceiling fan motor housing and cover side fixing structure according to claim 1, further comprising a plurality of heat dissipating holes, the plurality of heat dissipating holes being formed at an edge of the lower accommodating groove of the cover body.

* * * * *